United States Patent [19]
Renfro

[11] Patent Number: 6,086,031
[45] Date of Patent: Jul. 11, 2000

[54] GUN AND BEVERAGE SUPPORT SYSTEM

[76] Inventor: Norman E. Renfro, 1667 Manchester Cove, Southaven, Miss. 38671-4618

[21] Appl. No.: 09/309,737

[22] Filed: May 11, 1999

[51] Int. Cl.[7] ...................................................... E04G 3/00
[52] U.S. Cl. .................... 248/218.4; 182/187; 248/230.8; 248/311.2
[58] Field of Search ............................ 248/218.4, 219.4, 248/230.8, 230.9, 311.2; 42/94; 182/187

[56] References Cited

U.S. PATENT DOCUMENTS

| | | | |
|---|---|---|---|
| 1,542,548 | 6/1925 | Gordon | 248/230.8 |
| 3,022,898 | 2/1962 | Loeb | 248/230.8 |
| 4,606,523 | 8/1986 | Statz et al. | 248/311.2 |
| 5,469,934 | 11/1995 | Pherigo | 182/187 |
| 5,507,362 | 4/1996 | Krueger | 182/187 X |
| 5,938,160 | 8/1999 | Hartmann et al. | 248/311.2 |

Primary Examiner—Ramon O. Ramirez

[57] ABSTRACT

A gun and beverage support system for supporting a weapon and a beverage while the hunter is sitting or standing within a tree stand. The inventive device includes an elongated base having a pair of outer eyelets and a pair of inner eyelets, a strap removably attachable to the eyelets, a plate attached to the base, a beverage holder attached to the plate, an upper spike and a lower spike attached to the plate, and a first hook and a second hook attached to the elongated base for removably receiving a rifle or bow. The beverage holder comprises a support member extending from the plate with a ring secured to the upper surface of the support member. The strap is preferably constructed of an elastic material for fitting various diameters of trees. The inner eyelets are utilized for narrower trees while the outer eyelets are utilized for broader trees. The upper spike and the lower spike penetrate the tree for preventing shifting or other movements of the elongated base. The first hook preferably includes a first padding and the second hook preferably includes a second padding. A cap is provided for the upper spike and the lower spike for protecting the user during nonuse of the invention.

9 Claims, 8 Drawing Sheets

GUN AND BEVERAGE SUPPORT SYSTEM

BACKGROUND OF THE INVENTION

1. Field of the Invention

The present invention relates generally to gun racks and more specifically it relates to a gun and beverage support system for supporting a weapon and a beverage while the hunter is sitting or standing within a tree stand.

Hunting is an extremely popular sport throughout the world. Often times a hunter will wait within a group of trees for wild game to pass by. Other times tree stands are utilized where the hunter waits for the game high up in the tree. The hunter will usually wait hours before a desirable game animal passes by. Holding the rifle or bow can be extremely tiring over this period of time thereby weakening the hunter and hampering their ability to properly aim the weapon when needed. Since most conventional tree stands do not have a gun rack, the hunter must physically retain the weapon. Also, many hunters will bring a beverage with them such as coffee wherein there is no place upon conventional tree stands to place such beverage containers.

2. Description of the Prior Art

Gun racks have been in use for years. Typically, a gun rack includes a plurality of racks for storing a plurality of weapons such as bows or rifles. A conventional gun rack is designed to be mounted within a house structure or a vehicle. However, conventional gun racks are unable to be utilized outdoors within a tree stand to support a rifle or bow.

Examples of gun racks include U.S. Pat. No. 3,022,898 to Loeb; U.S. Pat. No. 5,685,103 to Wiggins; U.S. Pat. No. 5,595,333 to Boston; U.S. Pat. No. 602,177 to Wiler which are all illustrative of such prior art.

Loeb (U.S. Pat. No. 3,022,898) discloses a gun holder. Loeb teaches a base member, a pair of hooks attached to the base member, and a strap member adjustably connected to the base member for attaching to a tree. However, Loeb does not teach a gun holder that simultaneously retains a beverage container nor that is adjustable for various diameters of trees.

Wiggins (U.S. Pat. No. 5,685,103) discloses a gun support. Wiggins teaches a base, a strap attached to the base for surrounding a tree, an arm pivotally attached to the base, and a first belt and a second belt attached to the distal end of the arm for retaining a rifle.

Boston (U.S. Pat. No. 5,595,333) discloses a rack for carrying a bow or long gun on an all-terrain vehicle (ATV). Wiler (U.S. Pat. No. 602,177) discloses a gun rack that is attachable to a tent pole or other similar structure.

While these devices may be suitable for the particular purpose to which they address, they are not as suitable for supporting a weapon and a beverage while the hunter is sitting or standing within a tree stand. Conventional gun racks do not have a beverage holder for retaining a beverage during nonuse. Also, conventional gun racks do not attach to various diameter of trees.

In these respects, the gun and beverage support system according to the present invention substantially departs from the conventional concepts and designs of the prior art, and in so doing provides an apparatus primarily developed for the purpose of supporting a weapon and a beverage while the hunter is sitting or standing within a tree stand.

SUMMARY OF THE INVENTION

In view of the foregoing disadvantages inherent in the known types of gun racks now present in the prior art, the present invention provides a new gun and beverage support system construction wherein the same can be utilized for supporting a weapon and a beverage while the hunter is sitting or standing within a tree stand.

The general purpose of the present invention, which will be described subsequently in greater detail, is to provide a new gun and beverage support system that has many of the advantages of the gun racks mentioned heretofore and many novel features that result in a new gun and beverage support system which is not anticipated, rendered obvious, suggested, or even implied by any of the prior art gun racks, either alone or in any combination thereof.

To attain this, the present invention generally comprises an elongated base having a pair of outer eyelets and a pair of inner eyelets, a strap removably attachable to the eyelets, a plate attached to the base, a beverage holder attached to the plate, an upper spike and a lower spike attached to the plate, and a first hook and a second hook attached to the elongated base for removably receiving a rifle or bow. The beverage holder comprises a support member extending from the plate with a ring secured to the upper surface of the support member. The strap is preferably constructed of an elastic material for fitting various diameters of trees. The inner eyelets are utilized for narrower trees while the outer eyelets are utilized for broader trees. The upper spike and the lower spike penetrate the tree for preventing shifting or other movements of the elongated base. The first hook preferably includes a first padding and the second hook preferably includes a second padding. A cap is provided for the upper spike and the lower spike for protecting the user during nonuse of the invention.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a gun and beverage support system that will overcome the shortcomings of the prior art devices.

Another object is to provide a gun and beverage support system that simultaneously retains a weapon and a beverage container.

An additional object is to provide a gun and beverage support system that attaches to a tree.

A further object is to provide a gun and beverage support system that is attachable to various diameters of trees.

Another object is to provide a gun and beverage support system that provides easy access to a rifle or bow.

An additional object is to provide a gun and beverage support system that relieves a hunter of the strain of sitting while retaining a rifle or bow.

Another object is to provide a gun and beverage support system that is easy to attach and remove from a tree.

A further object is to provide a gun and beverage support system that will not shift or tilt while attached to the tree.

Another object is to provide a gun and beverage support system that prevents accidental dropping of a rifle or bow.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several view, FIGS. 1 through 8 illustrate a gun and beverage support system 10, which comprises an elongated base 20 having a pair of outer eyelets 22 and a pair of inner eyelets 24, a strap 30 removably attachable to the eyelets, a plate 40 attached to the base, a beverage holder attached to the plate 40, an upper spike 50 and a lower spike 52 attached to the plate 40, and a first hook 60 and a second hook 70 attached to the elongated base 20 for removably receiving a rifle 14 or bow. The beverage holder comprises a support member 46 extending from the plate 40 with a ring 44 secured to the upper surface of the support member 46. The strap 30 is preferably constructed of an elastic material for fitting various diameters of trees 12. The inner eyelets 24 are utilized for narrower trees 12 while the outer eyelets 22 are utilized for broader trees 12. The upper spike 50 and the lower spike 52 penetrate the tree 12 for preventing shifting or other movements of the elongated base 20. The first hook 60 preferably includes a first padding 62 and the second hook 70 preferably includes a second padding 72. A cap 54 is provided for the upper spike 50 and the lower spike 52 for protecting the user during nonuse of the invention.

Figure 1:
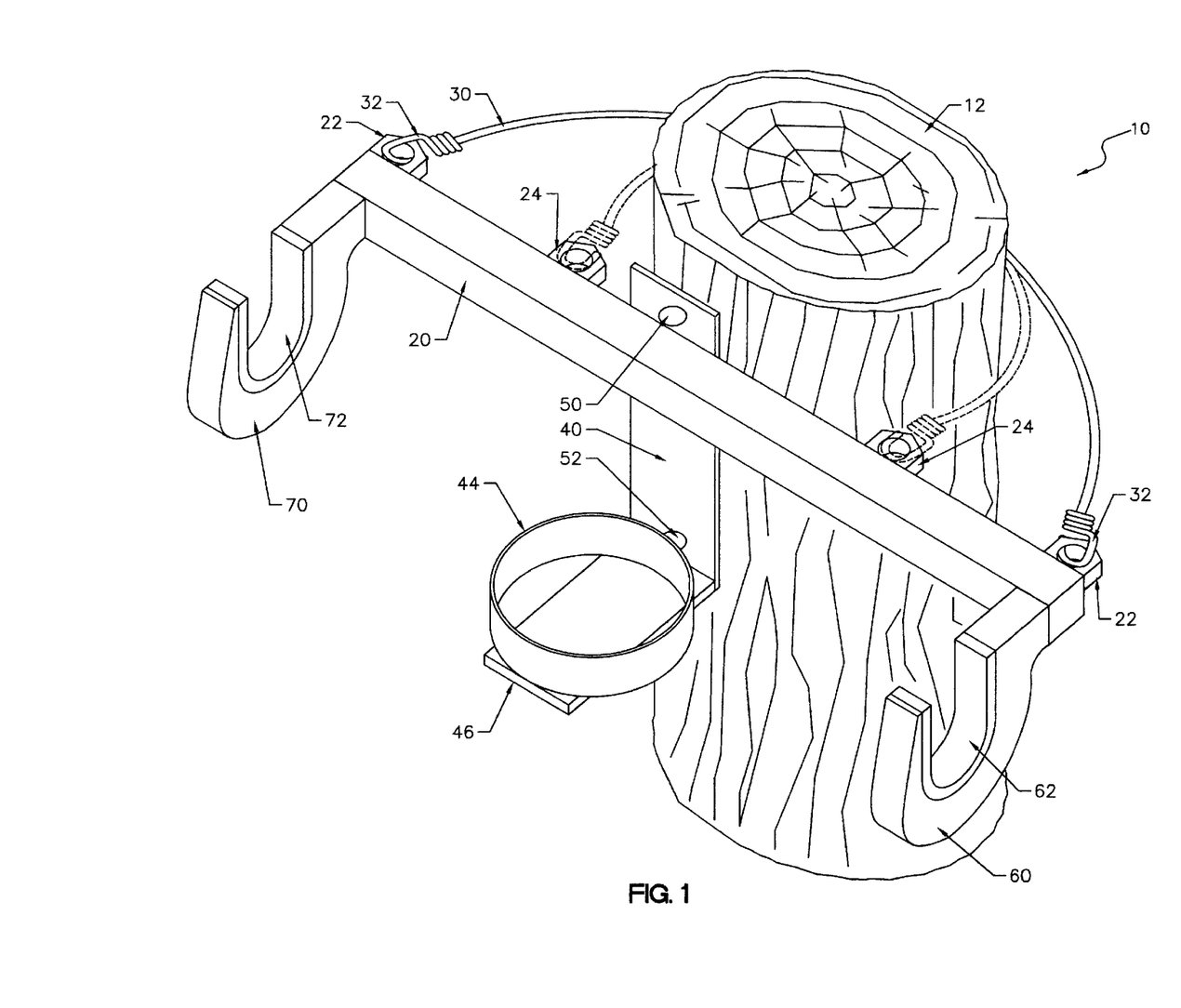
FIG. 1 is an upper perspective view of the present invention attached to a tree.
Figure 2:
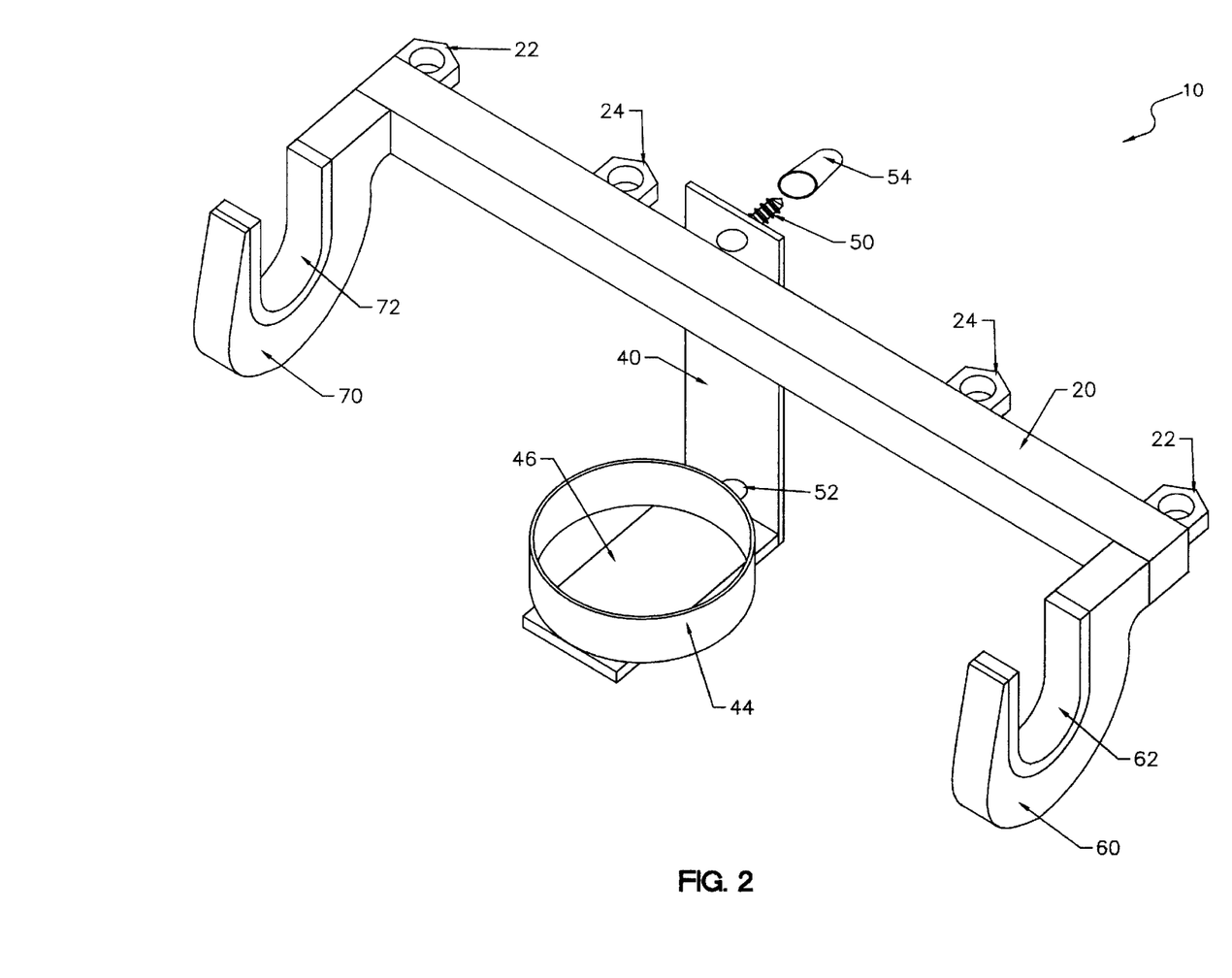
FIG. 2 is an upper perspective view of the present invention.
Figure 3:
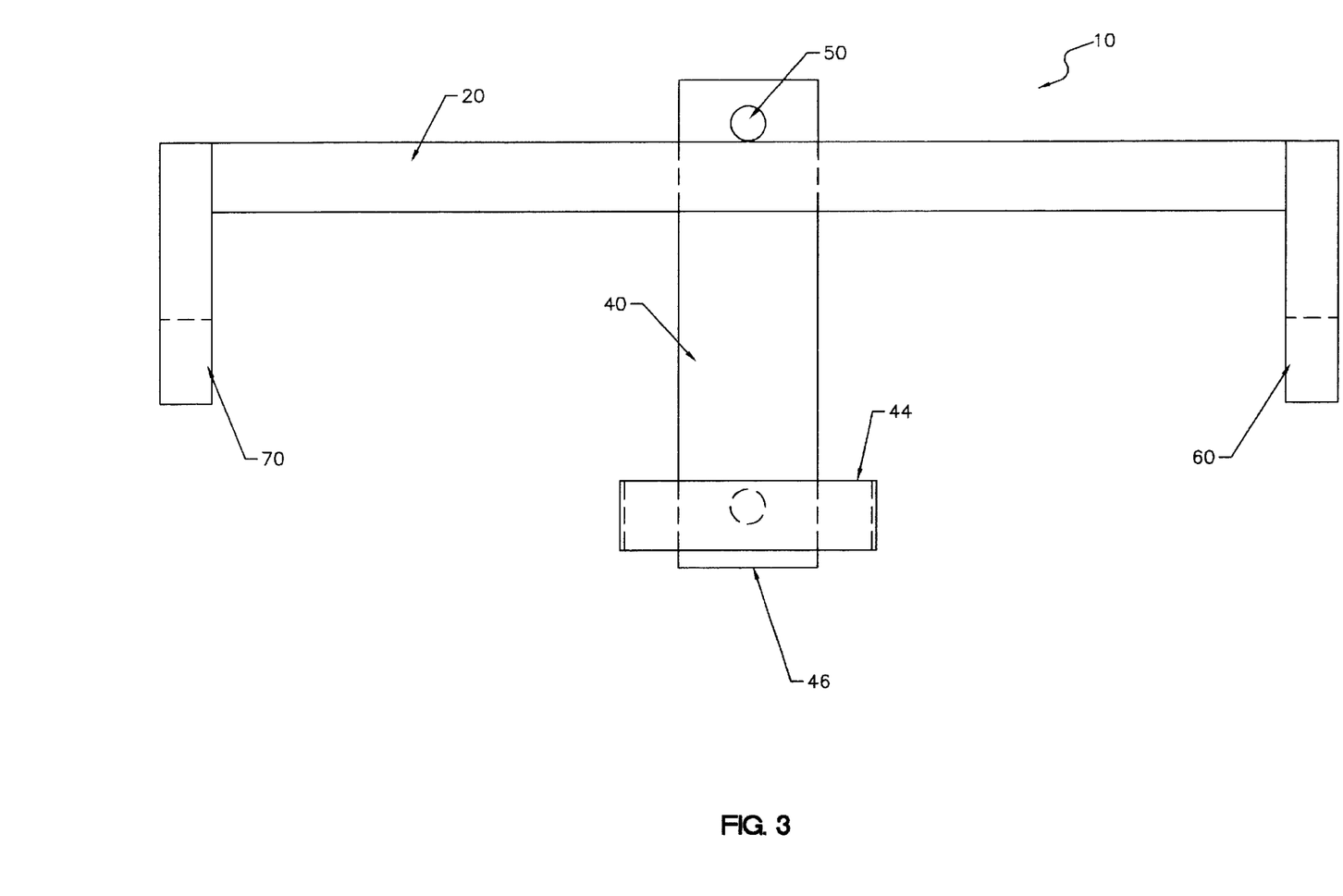
FIG. 3 is a front view of the present invention.

As shown in FIGS. 1 through 3, the elongated base 20 is preferably constructed of square tubing, however it can be appreciated that any well-known structure or material may be utilized. The elongated base 20 has two opposing distal ends and is preferably longer than the tree 12 to be attached to.

Figure 5:
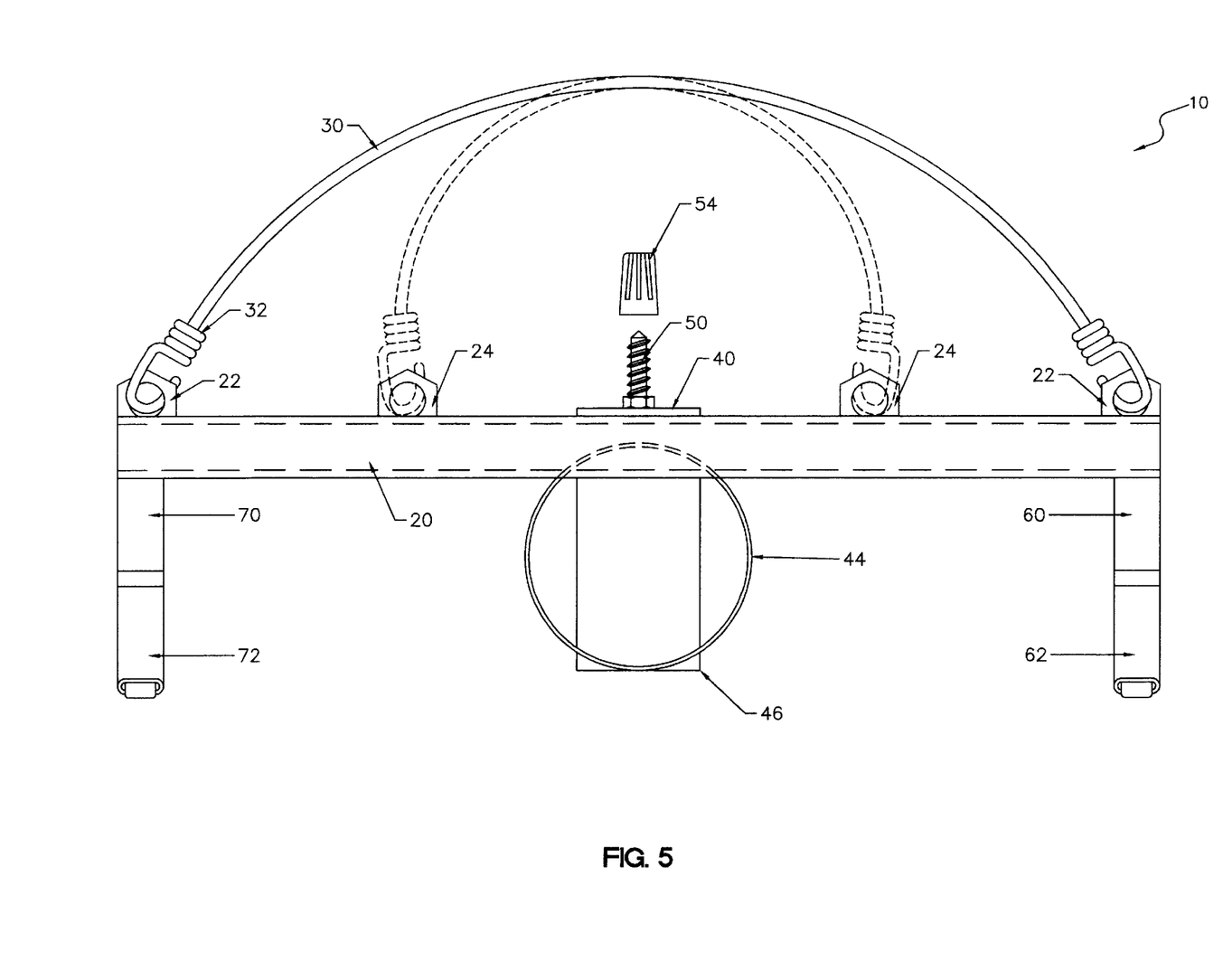
FIG. 5 is a top view of the present invention.
Figure 6:
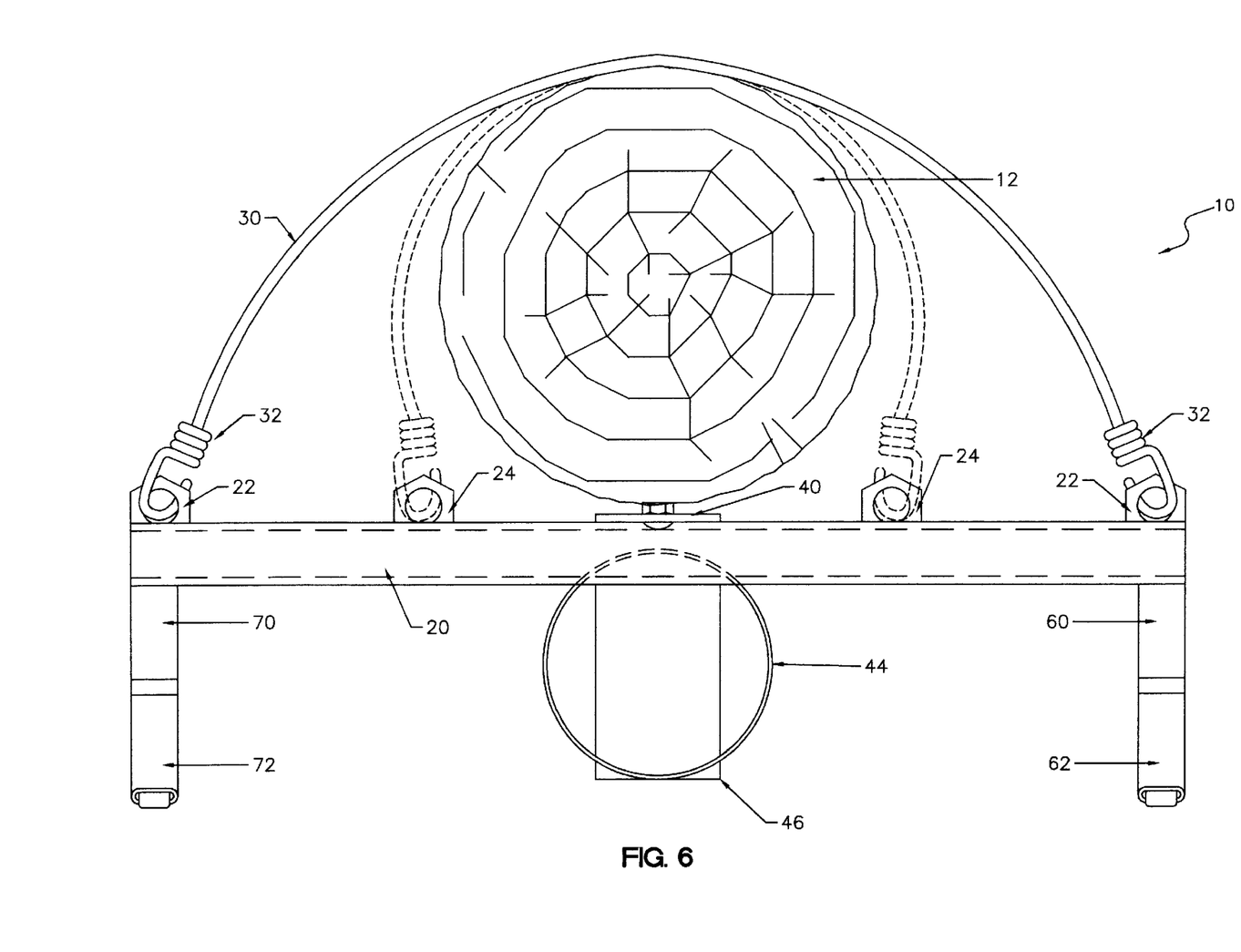
FIG. 6 is a top view of the present invention surrounding a tree.

As best shown in FIGS. 5 and 6 of the drawings, a pair of outer eyelets 22 are attached to the opposing distal ends of the elongated base 20. A pair of inner eyelets 24 are attached to the elongated base 20 between the outer eyelets 22. The outer eyelets 22 are utilized for wider diameter trees 12 and the inner eyelets 24 are utilized for narrower diameter trees 12.

As shown in FIGS. 1, 5, 6, 7 and 8, a length of strap 30 is provided having a claw 32 at each distal end for engaging either the outer eyelets 22 or the inner eyelets 24. The strap 30 is preferably constructed of an elastic material for allowing stretching about various diameters of trees 12 and for snugly retaining the elongated base 20 to the tree 12. The strap 30 is also preferably comprised of an elastic material to conform to various shapes of the tree 12 thereby ensuring maximum gripping of the tree 12. Alternative, a strap 30 having an adjustable buckle means could be utilized for securing 44 about a tree 12.

As shown in FIGS. 1 through 6 of the drawings, a plate 40 is attached to a rear surface of the elongated base 20. The plate 40 extends upwardly and downwardly from the elongated base 20 substantially parallel to the outer surface of the tree 12.

Figure 4:
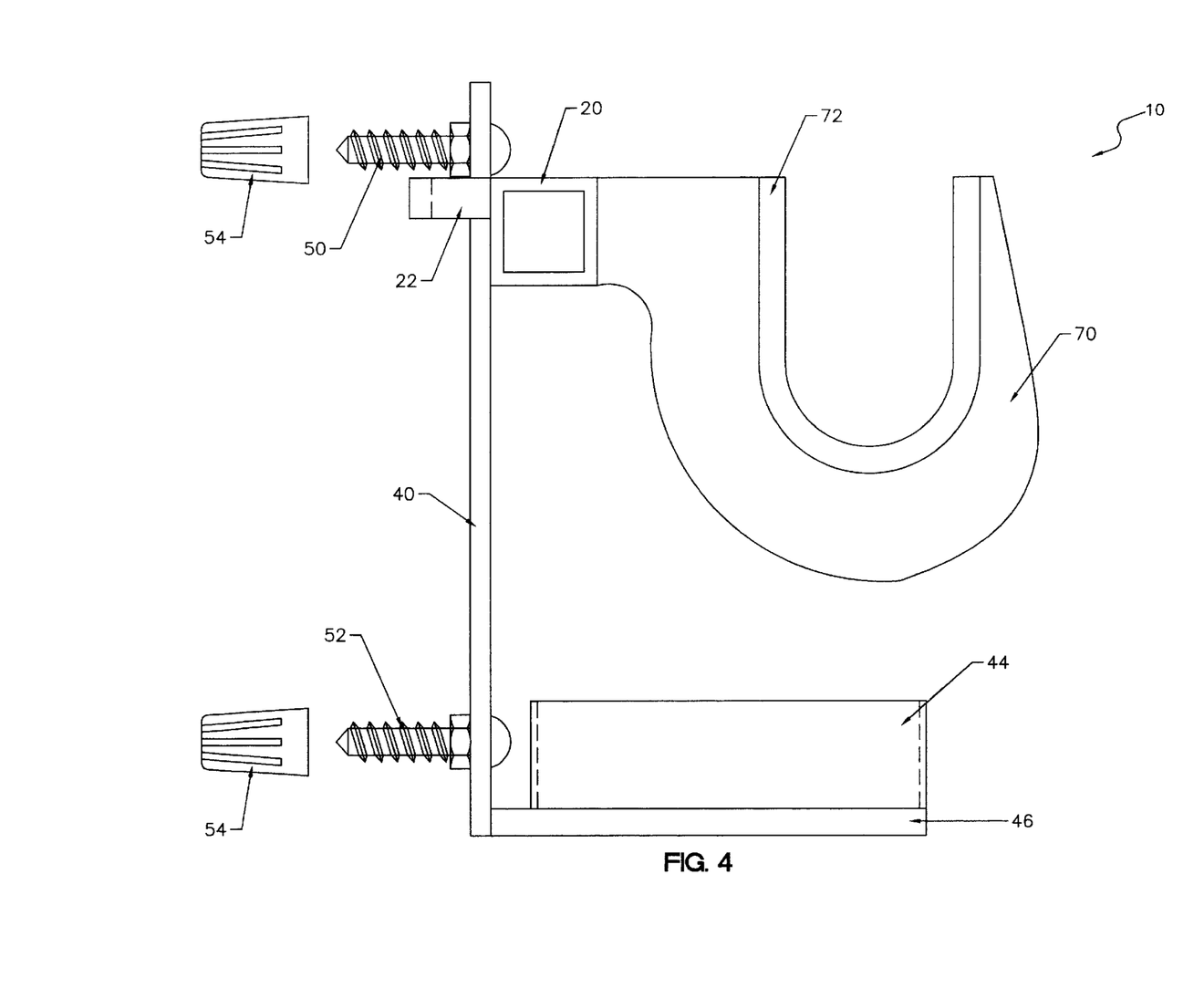
FIG. 4 is a side view of the present invention.

As best shown in FIG. 4 of the drawings, an upper spike 50 is attached to an upper portion of the plate 40. A lower spike 52 is attached to a lower portion of the plate 40. Additional spikes may be added to increase the gripping of the tree 12. The spikes 50, 52 are preferably threaded for increasing the engagement with the tree 12. The upper spike 50 and the lower spike 52 penetrate the tree 12 during utilization for preventing tilting or vertical movements of the elongated base 20 while supporting a rifle 14 and/or a beverage container 16. A removable cap 54 is provided for each of the upper spike 50 and the lower spike 52 for encapsulating the spikes 50, 52 during nonuse and transportation to the hunting site.

Figure 7:
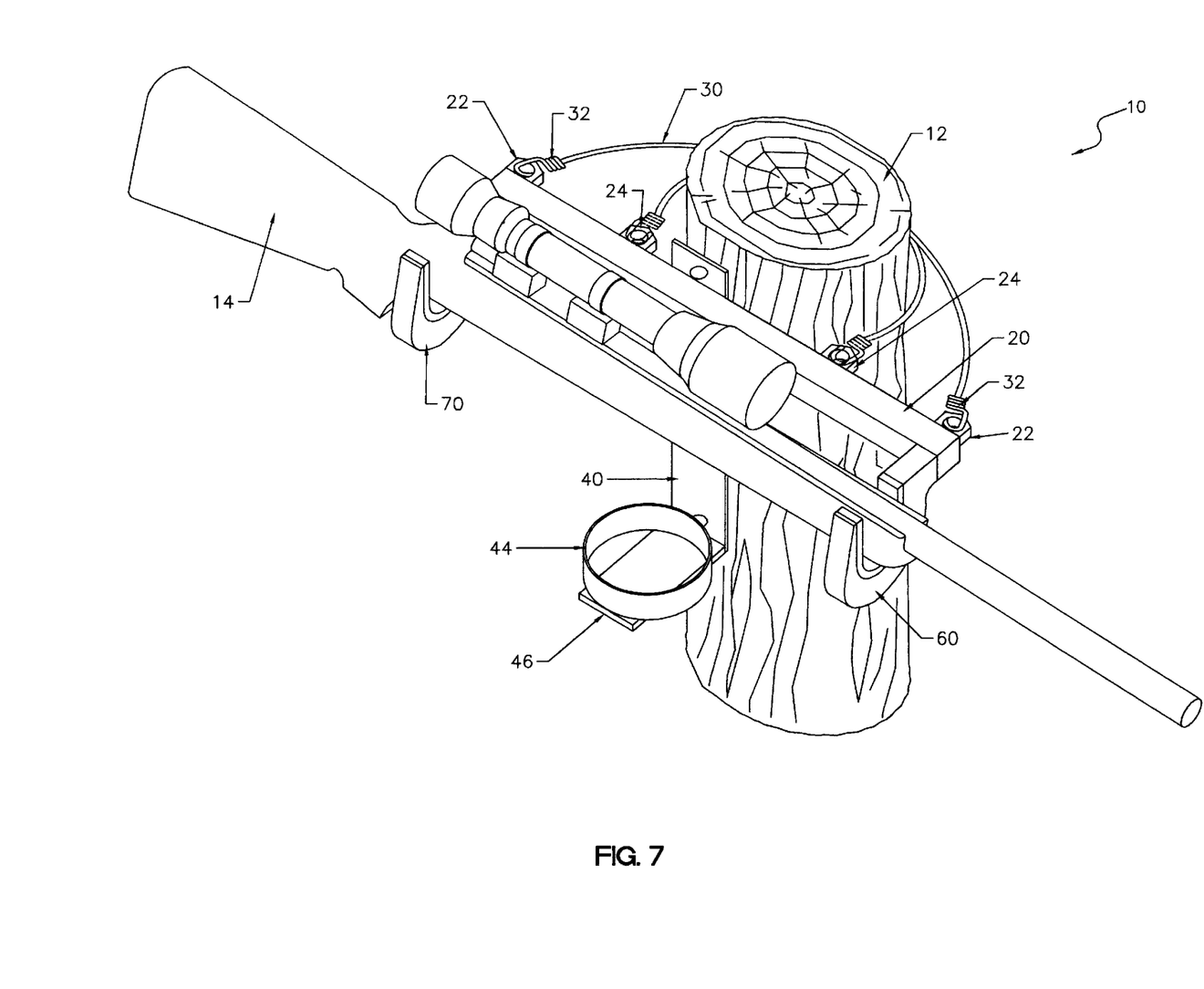
FIG. 7 is an upper perspective view of the present invention attached to a tree while retaining a rifle.
Figure 8:
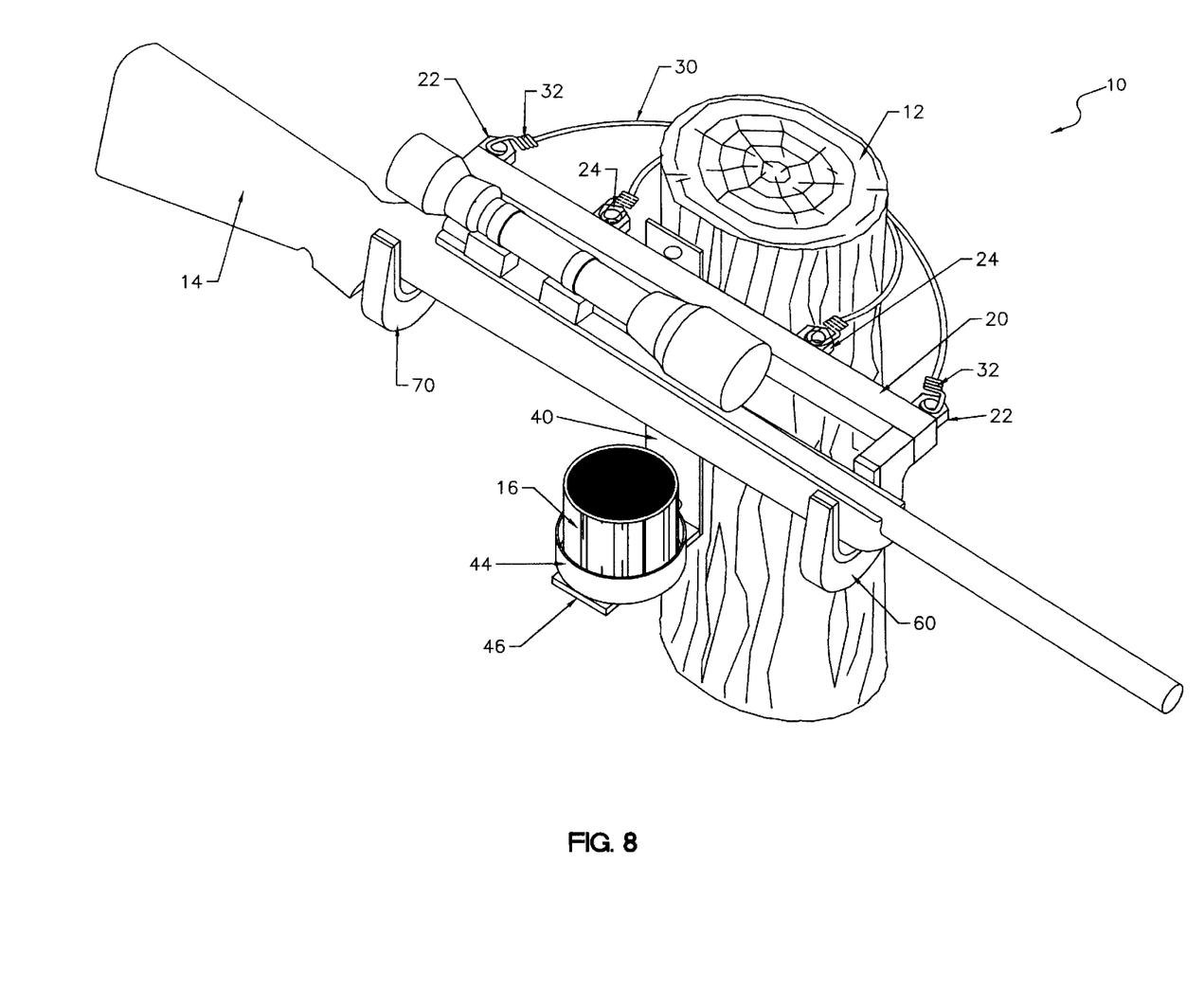
FIG. 8 is an upper perspective view of the present invention attached to a tree while simultaneously retaining a rifle and beverage container.

As shown in FIGS. 1 through 3 of the drawings, a first hook 60 is attached to one of the distal ends of the elongated base 20 opposite of one of the outer eyelets 22. A first padding 62 is attached within the open portion of the first hook 60 for protecting the rifle 14 or bow positioned within the first hook 60 as shown in FIGS. 7 and 8 of the drawings.

As shown in FIGS. 1 through 3 of the drawings, a second hook 70 is attached to the distal end of the elongated base 20 opposite of the first hook 60. A second padding 72 is attached within the open portion of the second hook 70 for protecting the rifle 14 or bow positioned with in the second hook 70 as shown in FIGS. 7 and 8 of the drawings. A rifle 14 or bow is removably supportable between the first hook 60 and the second hook 70 as shown in FIGS. 7 and 8 of the drawings.

As shown in FIGS. 1 through 7, a support member 46 is secured to a lower portion of the plate 40 orthogonally and extends away from the tree 12. A ring 44 is secured to the upper surface of the support member 46 for surrounding a beverage container 16 as shown in FIG. 8 of the drawings. The support member 46 supports the lower surface of the beverage container 16 during storage of the beverage container 16.

In use, the user selects a tree 12 and secures the tree 12 stand to the tree 12 at the desired level. The user then enters the tree 12 stand and selects the desired height for the present invention. The user removes the cap 54 off each the upper spike 50 and the lower spike 52. The user manually inserts the upper spike 50 and the lower spike 52 into the tree 12 until the plate 40 and the elongated base 20 are adjacent the tree 12. The user then secures the strap 30 to the appropriate eyelets 22, 24 depending upon the diameter of the tree 12. The user then may place their rifle 14 or bow within the hooks 60, 70 for supporting the weapon during nonuse. The user may also place a beverage container 16 within the ring 44 for supporting the beverage container 16 during nonuse. When the user is finished utilizing the present invention the above process is simply reversed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A weapon and beverage support system, comprising:
    a base;
    a first hook attached to said base;
    a second hook attached to said base, wherein said first hook and said second hook support a weapon;
    a plurality of eyelets secured to said base;
    a length of strap removably attachable to said plurality of eyelets for surrounding a tree;
    a plate attached to a rear surface of said base;
    at least one spike attached to said plate for penetrating said tree; and
    wherein said means for supporting a beverage container comprises:
    a support member secured orthogonally to a lower portion of said plate; and
    a ring secured to an upper surface of said support member large enough to receive said beverage container.

2. The weapon and beverage support system of claim 1, wherein said plurality of eyelets comprises:
    a pair of outer eyelets attached to opposing distal ends of said base; and
    a pair of inner eyelets attached to said base between said pair of outer eyelets.

3. The weapon and beverage support system of claim 1, wherein:
    said first hook includes a first padding; and
    said second hook includes a second padding.

4. The weapon and beverage support system of claim 1, wherein said at least one spike is threaded.

5. The weapon and beverage support system of claim 1, wherein said at least one spike comprises:
    an upper spike secured to an upper portion of said plate; and
    a lower spike secured to a lower portion of said plate.

6. The weapon and beverage support system of claim 1, wherein said strap is comprised of an elastic material.

7. The weapon and beverage support system of claim 1, wherein said strap has a first claw and a second claw attached to opposing ends of said strap.

8. A weapon and beverage support system, comprising:
    a base;
    a first hook and a second hook attached to said base, wherein said first hook and said second hook are capable of supporting a weapon;
    a means for securing said base to a tree;
    a plate attached to said base;
    a support member secured orthogonally to a lower portion of said plate; and
    a ring secured to an upper surface of said support member large enough to receive a beverage container.

9. The weapon and beverage support system of claim 8, wherein:
    said first hook includes a first padding; and
    said second hook includes a second padding.

* * * * *